United States Patent [19]

Morimoto

[11] Patent Number: 4,667,567

[45] Date of Patent: May 26, 1987

[54] PULL-TYPE BOOSTER FOR VEHICLE

[75] Inventor: Hideyuki Morimoto, Kanagawa, Japan

[73] Assignee: Nippon Air Brake Co., Ltd., Kobe, Japan

[21] Appl. No.: 591,006

[22] Filed: Mar. 19, 1984

[30] Foreign Application Priority Data

| Mar. 23, 1983 [JP] | Japan | 58-42560 |
| Mar. 23, 1983 [JP] | Japan | 58-42561 |
| Mar. 23, 1983 [JP] | Japan | 58-42562 |

[51] Int. Cl.$^4$ ............................................. F15B 9/10
[52] U.S. Cl. .................................. 91/376 R; 91/391 R; 92/84; 92/137
[58] Field of Search ................ 91/376 R, 378, 370, 91/371, 372, 373, 391 R, 369 A; 92/84, 137

[56] References Cited

U.S. PATENT DOCUMENTS

| 1,583,117 | 4/1926 | Bragg et al. | 91/376 R |
| 1,801,483 | 4/1931 | Bragg et al. | 91/376 R |
| 2,305,265 | 12/1942 | Tourneau | 277/212 FB |
| 3,096,689 | 7/1963 | Kytta | 91/369 A X |
| 3,410,179 | 11/1968 | Kytta et al. | 92/167 |
| 3,754,450 | 8/1973 | Putt et al. | 91/369 A X |
| 3,901,518 | 8/1975 | Uchida | 277/212 FB |
| 4,176,815 | 12/1979 | Davidson et al. | 403/349 X |
| 4,251,050 | 2/1981 | McInerney | 92/167 |

FOREIGN PATENT DOCUMENTS

| 1131566 | 10/1956 | France . |
| 140074 | 12/1976 | Japan . |
| 36183 | 8/1982 | Japan . |

Primary Examiner—Robert E. Garrett
Assistant Examiner—Mark A. Williamson
Attorney, Agent, or Firm—James P. Ryther

[57] ABSTRACT

A pull-type booster for a vehicle includes a main body having an internal space; a movable body including a head portion and a cylindrical portion formed integrally with the head portion, the head portion being arranged in the internal space and partitioning the internal space into a lower pressure chamber at one side and a control chamber at another side, and the cylindrical portion projecting from the main body at the other side; a through hole formed in the movable body; a pull input rod extending across the low pressure chamber and projecting through a seal member from the main body at the one side; a plunger arranged slidably in the through hole and combined with a head portion of the pull input rod; a valve member arranged in the through hole and operated by the plunger for generating pressure difference between the lower pressure chamber and the control chamber and moving the movable body in the direction of the lower pressure chamber, a power transmission assembly arranged in an opening end portion of the through hole and engaged with the plunger and a pull output rod engaged with the power transmission assembly and projecting outwards from the cylindrical portion of the movable body.

41 Claims, 9 Drawing Figures

PULL-TYPE BOOSTER FOR VEHICLE

BACKGROUND OF THE INVENTION

1. Field of the Invention

This invention relates to a pull-type booster for a vehicle which aids in operating a brake apparatus or a clutch apparatus.

2. Description of the Prior Art

A push-type booster for a vehicle is widely known which aids in operating a brake apparatus or a clutch apparatus. In such a booster, an input force is not a pulling force, but a pushing force. Accordingly, when the push-type booster is used for a wire-operating apparatus, there are the problems that the mounting position of the push-type booster is subject to much restriction, or that it cannot be mounted in a limited space within the vehicle.

Recently, a pull-type booster has been developed to solve the above described problems. However, the assembling is troublesome, and the valve operation is unstable.

SUMMARY OF THE INVENTION

Accordingly, it is an object of this invention to provide a novel pull-type booster which overcomes the defects of the push-type booster.

Another object of this invention is to provide a pull-type booster which can be more easily manufactured.

A further object of this invention is to provide a pull-type booster which can be securely operated.

A still further object of this invention is to provide a pull-type booster which can be small-sized in construction.

A still further object of this invention is to provide a pull-type booster in which a mounting construction to the chassis of the vehicle can be simple.

In accordance with an aspect of this invention, a pull-type booster for vehicle includes: (A) a main body having an internal space; (B) a movable body including a head portion and a cylindrical portion formed integrally with said head portion, said head portion being arranged in said internal space and partitioning said internal space into a lower pressure chamber at one side and a control chamber at another side and said cylindrical portion projecting from said main body at said other side; (C) a through hole formed in said movable body; (D) a pull input means extending across said low pressure chamber and projecting through a seal means from said main body at said one side; (E) a plunger means arranged slidably in said through hole and combined with a head portion of said pull input means; (F) a valve means arranged in said through hole and operated by said plunger means for generating pressure difference between said lower pressure chamber and said control chamber and moving said movable body in the direction of said lower pressure chamber; (G) a power transmission means arranged in an opening end portion of said through hole and engaged with said plunger means; and (H) a pull output means engaged with said power transmission means and projecting outwards from said cylindrical portion of the movable body.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENT

Figure 1:
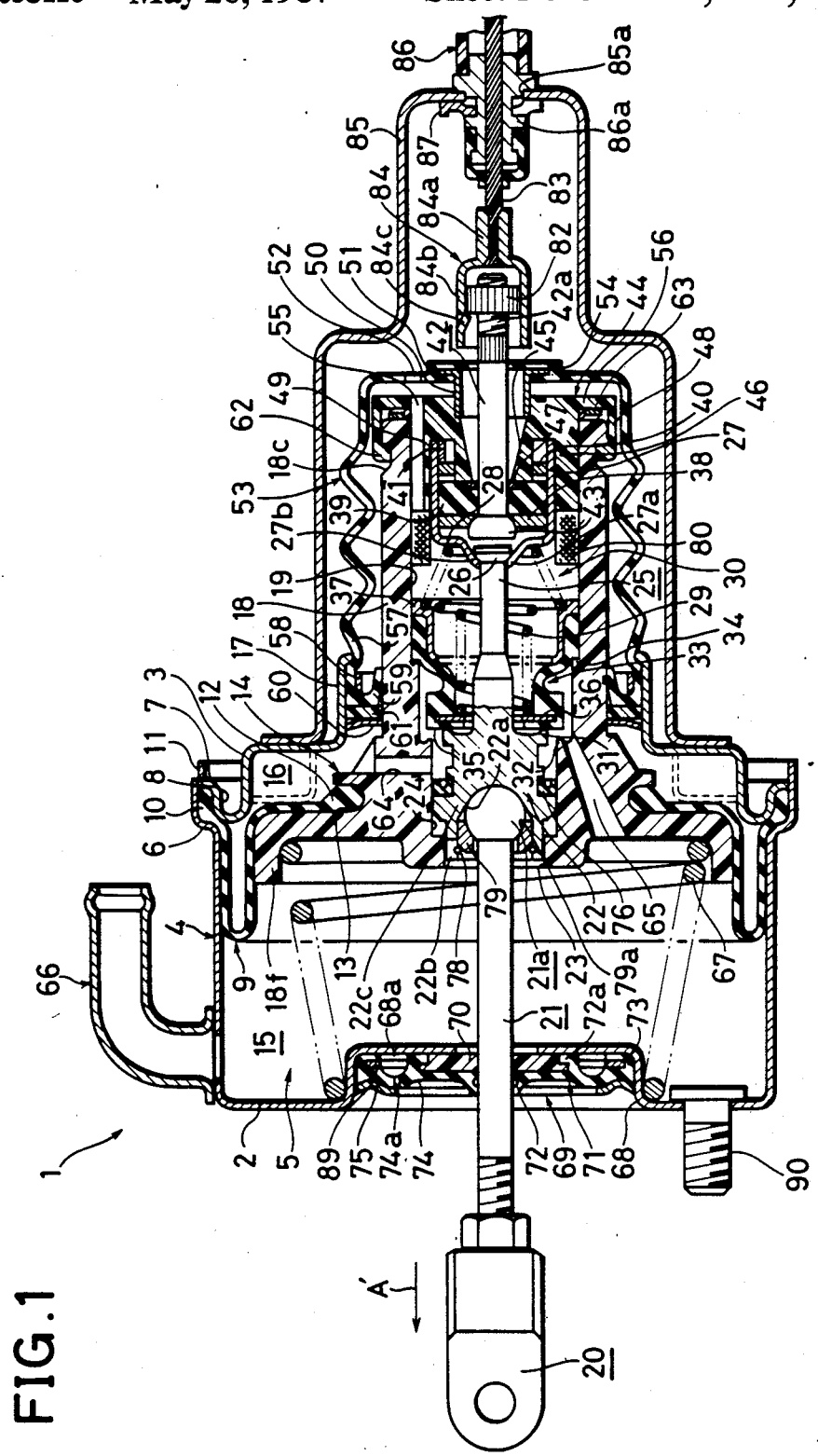
FIG 1 is a cross-sectional view of a pull-type booster for vehicle to one embodiment of this invention.

In FIG. 1, a pull-type booster according to one embodiment of this invention is generally represented by a reference numeral 1. A cup-shaped rear shell 2 and a generally dish-shaped front shell 3 are combined with each other so as to form a main body 4. An internal space 5 is formed in the main body 4. A diaphragm 9 is arranged in the space 5. An outer circumferential bead 10 of the diaphragm 9 is compressed by a stepped portion 6 of the rear shell 2, a flange portion 7 of the front shell 3, and a marginal portion 8 thereof. The flange portion 7 of the front shell 3 is engaged with radial projections 11 of the rear shell 2. Thus, the rear shell 2 and the front shell 3 are air-tightly combined with each other.

A movable body 14 made of synthetic resin is inserted into the space 5 of the main body 4. The movable body 14 consists of a dish-shaped head portion 18f and a cylindrical portion 18 which are integrally and concentrically formed with each other. An inner circumferential bead 12 of the diaphragm 9 is air-tightly fitted into an annular groove 13 of the head portion 18f of the movable body 14. Thus, the space 5 of the main body 4 is divided into a vacuum chamber 15 and a control chamber 16 respectively at the side of the rear shell 2 and at the side of the front shell 3 by the head portion 18f of the movable body 14.

The cylindrical portion 18 of the movable body 14 is projected outwards from a cylindrical portion 17 of the front shell 3. A stepped through hole 19 is made in the movable body 14, in the axial direction thereof. An input rod 21 passes through the vacuum chamber 15 in the rear shell 2. One end portion of the input rod 21 is projected outwards from the rear shell 2, and screwed to a clevis 20. A not-shown clutch pedal is pivoted to the clevis 20. Another end portion of the input rod 21 is arranged in the left end portion of the stepped through hole 19. A plunger 22 is inserted in the stepped through hole 19, and slidaby fitted to a small diameter portion 23 and an intermediate diameter portion 24 of the stepped through hole 19. The input rod 21 and the plunger 22 are pivotally or slidably combined with each other.

A spherical head 21a is formed in the other end portion of the input rod 21, and slidably and swingably fitted to a spherical bottom of a recess 22a of the plunger 22. Further, a support ring 79 made of harder material than the spherical head 21a of the input rod 21 is fitted to the recess 22a of the plunger 22, and contacts with the spherical head 21a at its spherical surface 79a. The contact area between the support ring 79 and the spherical head 21a is increased by the spherical contact. Before the input rod 21 is screwed to the clevis 20, the support ring 79 is fitted to the input rod 21. Or, a cut-out is made in the support ring 79, and it is forcibly expanded so that the support ring 79 clears the spherical head 21a. A C-shaped stop ring 78 is fitted to the end portion of the recess 22a to prevent the support ring 79 and the spherical head 21a coming off from the recess 22a. A cut out 22b is made in the end portion of the plunger 22 for removing the stop ring 78 from the recess 22a. A slight gap is formed between the spherical surface 79a of the support ring 79 and the spherical head 21a so that the input rod 21 can freely swing with respect to the plunger 22.

Figure 2:
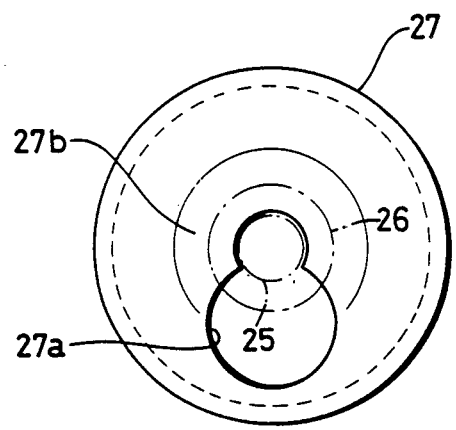
FIG. 2 is an enlarged front view of a cup-shaped casing in the pull-type booster of FIG. 1.

A stem portion 25 extending rightwards is formed integrally with a main portion 22c of the plunger 22. A hemi-spherical head 26 is formed in the end portion of the stem portion 25, and it is engaged with a cup-shaped casing 27. A guitar-shaped opening 27a, as shown in FIG. 2, is formed in the bottom portion of the casing 27. The hemi-spherical head 26 can pass through the lower large diameter portion, but it cannot pass through the upper smaller diameter portion of the guitar shaped opening 27a. A hemi-spherical recess 27b is formed in the center of the bottom of the casing 27. The hemi-spherical head 26 is slidably fitting to the hemi-spherical recess 27b. The former and the latter can swing with respect to each other.

A valve spring 30 and a poppet-type valve member 33 of rubber are arranged between the casing 27 and the main portion 22c of the plunger 22. The valve spring 30 consists of a conical coil spring portion 28 and a cylindrical coil spring portion 29 which are integrally formed with each other. One end of the conical coil spring portion 28 is received by the casing 27, and another end thereof is received by a spring receiving member 37 applied to the right end portion of the valve member 33. The right end portion of the valve member is pressed against a stepped portion 34 of the inside wall of the through hole 19 by the conical coil spring portion 28. One end of the cylindrical coil spring portion 29 is received by a spring receiving ring 36 applied to a seat portion 35 of the valve member 33. Valve seats 31 and 32 in the shape of annular projection are formed respectively in the main portion 22c of the plunger 22 and the inside wall of the through hole 19, and they are facing the seat portion 35 of the valve member 33 which is urged towards them by the cylindrical coil spring portion 29. In the non-operating condition of the pull-type booster 1, as shown in FIG. 1, the valve seat 31 of the plunger 22 contacts with the seat portion 35 of the valve member 33, while the valve seat 32 of the inside wall of the through hole 19 is separated from the seat portion 35 of the valve member 33.

Figure 3:
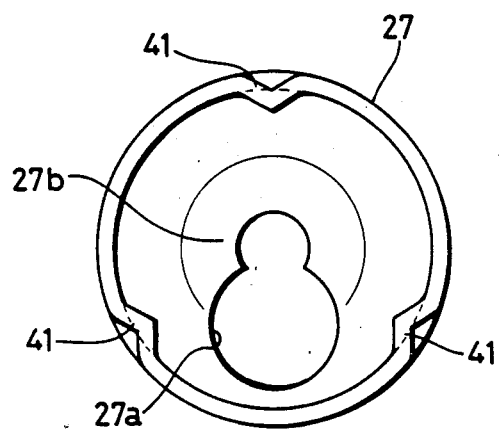
FIG. 3 is an enlarged rear view of the cup-shaped casing of FIG. 2.
Figure 4A:
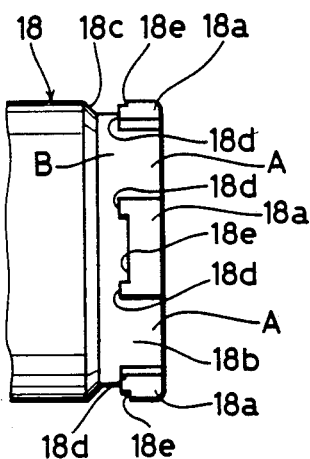
FIG. 4(a) is an enlarged side view of one end portion of a cylindrical portion of a movable body in the pull-type booster of FIG. 1.
Figure 4B:
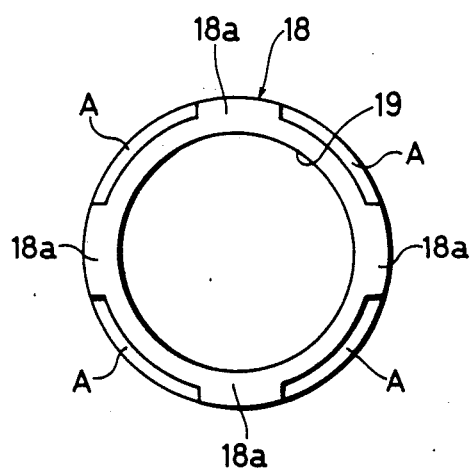
FIG. 4(b) is an enlarged rear view of the cylindrical portion of the movable body in the pull-type booster of FIG. 1.

A ring plate 38, a rubber disc 39 and another ring plate 40 are slidably received by the casing 27, and they are prevented from coming off from the casing 27 by radial projections 41 which are formed, as shown in FIG. 3, in the end of the casing 27. An output rod 42 passes through the ring plates 38, 40 and the rubber disc 39. A hemi-spherical head 43 of the output rod 42 is engaged with the ring plate 38 in spherical contact.

A power transmission block 44 of synthetic resin is combined with the right end opening portion of the cylindrical portion 18 of the movable body 14. An inside cylindrical portion 45 of the block 44 is slidably fitted between the ring plate 40 and the output rod 42, and it can contact with the right end surface of the rubber disc 39.

Next, there will be described a combining construction of the cylindrical portion 18 of the movable body 14 and the power transmission block 44, with reference to FIG. 4(a) to FIG. 6.

The outer surface of the end portion of the cylindrical portion 18 of the movable body 14 is so cut as to form heights 18a and a depression 18b. The depression 18b consists of first portions A and a second portion B communicating with the first portions A. The first portions A extend in the axial direction between the heights 18a. The second portion B extends in the peripheral direction between a stepped portion 18c of the cylindrical portion 18 and the heights 18c. A pair of projections 18d extending in the axial direction are formed in the heights 18a, respectively. A recess 18e is formed by the projections 18d.

Figure 5A:
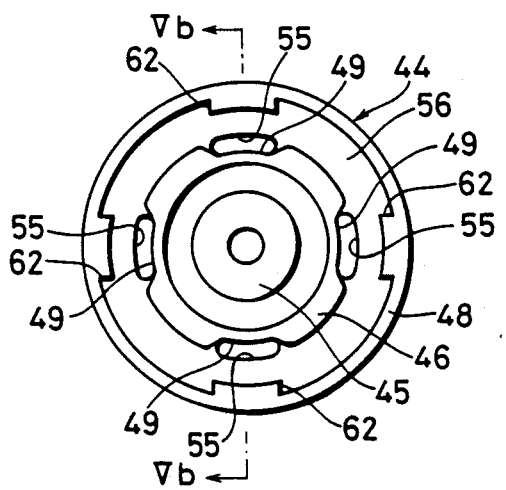
FIG. 5(a) is an enlarged front view of a block in the pull-type FIG. 1.
Figure 5B:
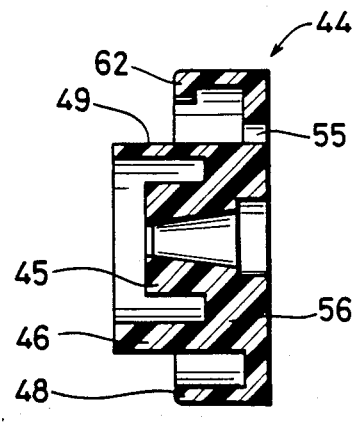
FIG. 5(b) is a cross-sectional view taken along the line Vb—Vb of FIG. 5(a)

An intermediate cylindrical portion 46 and an outside cylindrical portion 48 are formed concentrically with the inside cylindrical portion 45 in the block 44. The intermediate cylindrical portion 46 is fitted into the through hole 19 of the cylindrical portion 18 of the movable body 14. The outside cylindrical portion 48 is fitted to the outer surface of the cylindrical portion 18 of the movable body 14. Axial grooves 49 for passing air are formed in the outer surface of the intermediate cylindrical portion 46, as shown in FIG. 5(a). Openings 55 are formed in a flat bottom portion 56 between the intermediate cylindrical portion 46 and the outside cylindrical portion 48, and they align with the axial grooves 49. Radial projections 62 are formed at regular pitches in the inner surface of the outside cylindrical portion 48. They can pass through the first portions A of the depression 18b in the axial direction. Their axial length is smaller than the axial length of the second portion B of the depression 18b. Their peripheral length is smaller than the peripheral length of the recess 18e of the height 18a.

A waved spring ring 63 is arranged between the end surface of the cylindrical portion 18 of the movable body 14 and the flat bottom portion 56 of the block 44. The radial projections 62 of the block 44 are put into the first portion A of the depression 18b. The block 44 is pushed towards the stepped portion 18c of the cylindrical portion 18 of the movable body 14. The radial projections 62 are positioned in the second portion B. Then, the block 44 is rotated along the second portion B so that the radial projections 62 come face to face to the recesses 18e of the heights 18a, respectively, and they are fitted into the latter. The block 44 is fixed to the cylindrical portion 18 of the movable body 14 by spring action of the waved spring ring 63.

Figure 7:
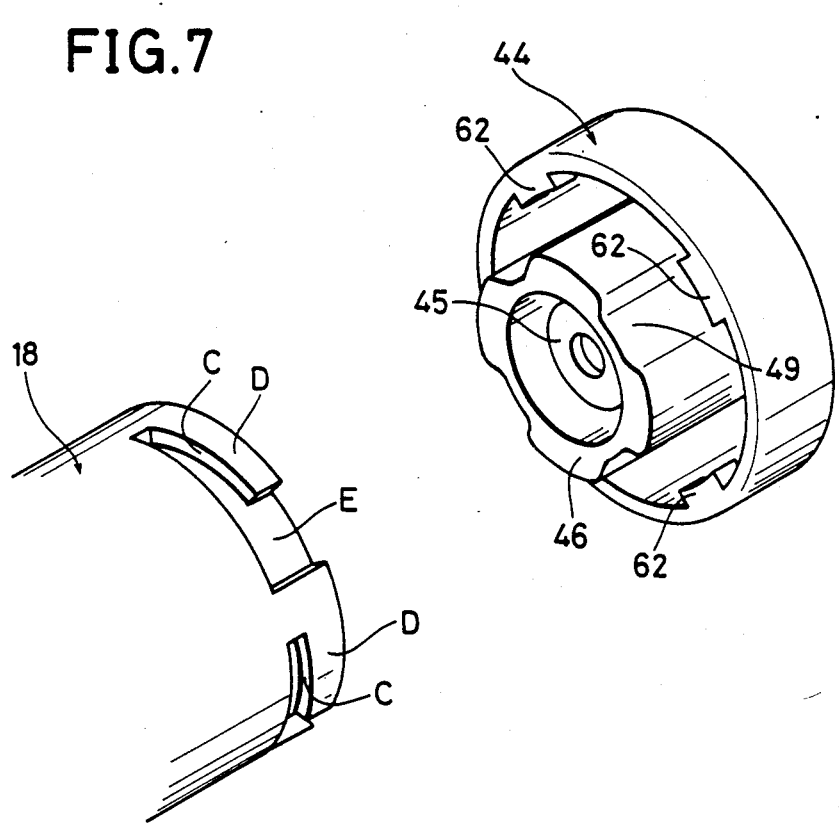
FIG. 7 is an exploded perspective view of one modification of the cylindrical portion of the movable body, and the block of FIG. 6.

FIG. 7 shows one modification of the combining construction of the block 44 and the cylindrical portion 18. In this case, L-shaped grooves E are formed in the outer surface of the cylindrical portion 18. Inner side surface C of height portions D are tapered. The radial projections 62 of the block 44 are passed through the grooves E in the axial direction. Then, the block 44 is rotated along the inner side surfaces C. Although the waved spring ring 63 is not used, the block 44 is elastically fixed to the cylindrical body 18 by the taper action of the inner side surfaces C.

Again referring to FIG. 1, a reinforcing ring plate 47 is embedded in the central portion of the rubber disc 39, facing the gap between the cylindrical portion 45 of the block 44 and the output rod 42. The inner diameter of the reinforcing ring plate 47 is nearly equal to the outer diameter of the output rod 42. The outer diameter of the reinforcing ring plate 47 is larger than the diameter of the left end of the inside hole of the cylindrical portion 45. In other words, the reinforcing ring plate 47 is so designed that the rubber disc 39 is not directly facing to the gap between the cylindrical portion 45 and the output rod 42.

A cylindrical support member 50 is forcibly fitted to the right end of the hole of the cylindrical portion 45 of the block 44. A rubber boot 53 covers the cylindrical portion 18 of the movable body 14. A ring portion 54 formed in the bottom of the rubber boot 53 is fitted and elastically fixed to a flange portion 51 of the cylindrical support member 50. An air filter (not shown) may be pinched between the ends of the cylindrical portion 18 and block 44 and a bending portion of the rubber boot 53. The bending portion is formed around the ring portion 54. Air vent openings 52 are made in the bending portion, facing to the openings 55.

A flexible bellows portion 57 is integrally contiguous to the bending portion . A lip-type seal portion 59 is integrally formed with the left end of the bellows portion 57, and it is pinched between the cylindrical portion 17 of the front shell 3 and the cylindrical portion 18 of the movable body 14. A C-shaped stopper ring 58 is elastically fitted to the seal portion 59 to press the outer circumference of the seal portion 59 against the inside wall of the cylindrical portion 17 of the front shell 3. A slide ring 61 of synthetic resin is slidably fitted to the cylindrical portion 18 of the movable body 14, in contact with the seal portion 59 of the boot 53, and it is prevented from coming out, by a stopper ring 60.

An air filter 80 is arranged within the through hole 19 of the cylindrical portion 18 of the movable body 14, in contact with the block 44. The internal space of the through hole 19 communicates through the air filter 80, plural axial grooves 49 formed in the intermediate cylindrical portion 46 of the block 44, the openings 55 of the bottom portion 56 and the air vent openings 52 of the boot 53, with atmosphere. The control chamber 16 communicates through a hole 64 formed in the radial direction of the cylindrical portion 18 of the movable body 14, with a space around the main portion 22c of the plunger 22. The vacuum chamber 15 communicates through a hole 65 formed substantially in the axial direction of the head portion 18f of the movable body , with a space around the poppet-type valve member 33. The vacuum chamber 15 communicates through a connection pipe 66 welded to the rear shell 2, with an air suction source such as an intake manifold of an engine or a vacuum pump.

The movable body 14 is urged rightwards by a preloaded spring 67 which extends between the rear shell 2 and the head portion 18f of the movable body 14, and it is stopped by an axial projecting portion of the front shell 3 (as shown by dotted lines), through the diaphragm 9 in the non-operating condition of the booster 1.

A seal assembly 69 is fitted into a recess 68 of the rear shell 2. The input rod 21 passes through the openings of the recess 68 and the seal assembly 69, and it is sealed by the seal assembly 69. The seal assembly 69 includes a slide ring 70 of synthetic resin, fitted to the input rod 21 with little gap, and a seal member 71 of rubber, covering the whole left surface of the slide ring 70. An outer annular projection of the slide ring 70 is fitted to an annular groove of the seal member 71. Thus, the slide ring 70 and the seal member 71 are elastically combined with each other. The slide ring 70 is slidable on the bottom surface of the recess 68 and on the input rod 21.

A lip portion 72 is formed in the inner circumference of the seal member 71, and it is elastically pressed to the input rod 21. A fixing portion 73 is formed in the outer circumference of the seal member 71, and it is elastically fitted to the corner of the recess 68. A metal core ring 89 is embedded in the fixing portion 73. A more flexible portion 74 is formed between the inside circumferential part including the lip portion 72 and the fixing portion 73 in the shape of an annular projection. The inside circumferential part of the seal member 71 can displace in the radial direction. The fixing portion 73 is prevented from falling out by a stop ring 75 which contacts with the outer circumferential portion of the more flexible portion 74.

Another lip portion 72a of the seal member 71 is fitted to the outer circumference of the side ring 70, and it is elastically and slidably pressed to the bottom surface of the recess 68. A space 68a formed between the fixing portion 73 and the lip portion 72a communicates through a small opening 74a of the more flexible portion 74 with atmosphere. Plural annular projections are formed in the lip portions 72 and 72a repectively. The plural annular projections of the lip portion 72a are not shown. They are pressed to the input rods 21 and the bottom surface of the recess 68. Thus, the latter are air-tightly sealed.

Next, there will be described a wire connecting construction and a wire guide supporting construction.

An annular nut 82 is screwed to a thread 42a of the output rod 42, and fitted into a cup-shaped connecting member 84. One end portion of a wire 83 is inserted into a cylindrical portion 84a of the connecting member 84, and the cylindrical portion 84a is calked or squashed. Thus, the one end portion of the wire 83 is fixed to the connecting member 84. Hooks 84c are formed in one end portion of a main body 84b of the connecting member 84, by shearing and bending. The nut 82 is supported and stopped by the hooks 84c. The hooks 84c are elastically deformable. Accordingly, they can clear the nut 2 from the right.

A generally U-shaped support member 85 is welded to the front shell 3. It is made of band material, and has a suitable width. A mounting metal member 86a is fitted into a hole 85a which is formed in a right end portion of the U-shaped support member 85. The wire 83 is guided by mounting metal member 86a and a wire guide tube 86. A U-shaped elastic clip 87 is pressed between an annular groove of the mounting metal member 86a and the support member 85. Actual clearance between the wire 83 and the wire guide tube 86 is further smaller than that shown.

The main portion 22c of the plunger 22 is sealed by a lip-type seal member 76. The booster 1 is fixed to a not-shown chassis of the automobile by bolts 90. Another end of the clutch wire 83 is connected to a not-shown clutch operating arm of a clutch apparatus.

Next, there will be described operation of the above-described pull-type booster 1.

The non-operating condition of the booster 1 is shown in FIG. 1. The right end of the casing 27 contacts with the block 44 by the spring force of the conical coil spring portion 28 of the valve spring 30. The plunger 22 is so positioned that the valve seat 31 of the plunger 22 contacts with the seat portion 35 of the valve member 33, and the valve seat 32 of the inside wall of the movable body 14 is separated from the seat portion 35 of the valve member 33, since the head 26 of the plunger 22 is engaged with the casing 27, and the spring force of the conical coil spring portion 28 of the valve spring 30 is larger than that of the cylindrical coil spring portion 29 of the valve spring 30. The vacuum chamber 15 and the control chamber 16 communicate with each other, and are interrupted from atmosphere. The vacuum chamber 15 is connected through the connecting pipe 66 to the air suction source. Accordingly, the chambers 15 and 16 are under negative pressure or very low pressure. There is no pressure difference between the vacuum chamber 15 and the control chamber 16. The head portion 18f of the movable body 14 contacts through the diaphragm 9 with the front shell 3 by the spring force of the preloaded spring 67.

In the above described condition, the not-shown clutch pedal connected to the clevis 20 is trodden to cut the clutch. The input rod 21 is pulled leftwards, as shown by the arrow A'. The plunger 22 and the casing 27 are moved leftwards against the spring force of the conical coil spring portion 28 of the valve spring 30. The seat portion 35 of the valve member 33 comes to contact with the valve seat 32 of the inside wall of the movable body 14. The valve seat 31 of the plunger 22 remains contacting with the seat portion 35 of the valve member 33. Thus, the connection is cut off between the vacuum chamber 15 and the control chamber 16. The plunger 22 is further moved leftwards. The valve seat 31 of the plunger 22 is separated from the seat portion 35 of the valve member 33, while the valve seat 32 of the inside wall of the movable body 14 contacts with the seat portion 35 of the valve member 33. Thus, the control chamber 16 comes to communicate with atmosphere. Air is supplied into the control chamber 16 from atmosphere. Some pressure difference is made between the vacuum chamber 15 and the control chamber 16. The movable body 14 is moved leftwards against the preloaded spring 67 by the pressure difference.

The casing 27 is moved leftwards by the pulling of the input rod 21. In the casing 27, the ring plate 40 comes to contact with the rubber disc 39 by the radial projections 41. Thus, the input force of the input rod 21 is transmitted to the rubber disc 39. The movement force of the movable body 14 is transmitted to the rubber disc 39 by the contact between the cylindrical portion 45 of the block 44 and the rubber disc 39. The total leftward force thus transmitted to the rubber disc 39 is transmitted as an output force through the ring plate 38 to the output rod 42. The output rod 42 is pulled leftwards to disconnect the clutch.

When the input force from the input rod 21 is held at a predetermined value, or when the input rod 21 is pulled leftwards by an aimed distance, the plunger 22 stops. The seat portion 35 of the valve member 33 moves to the valve seat 31 of the stopping plunger 22 together with the movable body 14, while the seat portion 35 of the valve member 33 is contacting the valve seat 32 of the inside wall of the movable body 14. The seat portion 35 of the valve member 33 comes into contact with the valve seat 31 of the stopping plunger 22. Thus, the flow of air into the control chamber 16 is stopped. The pressure of the control chamber 16 becomes constant. Accordingly, the pressure difference between the vacuum chamber 15 and the control chamber 16 becomes constant. In that condition, the total of the input force from the input rod 21 and movement force of the movable body 14 balances with the output force. In other words, one part of the output force balances with the input force, and another part of the output force balances with the movement force of the movable body 14, by elastic deformation of the rubber disc 39. Further, the input force balances with the movement force of the movable body 14 at a predetermined relationship.

The relationships among the above described forces are expressed as follows:

Assuming that the rubber disc 39 is uniformly deformed, $$F1/S1 = F2/S2$$

Since the total of the input force and movement force of the movable body 14 is equal to the output force, $$F3 = \left(1 + \frac{S1}{S2}\right) F1$$

where F1 represents the input force from the input rod 21, F2 the movement force of the movable body 14, F3 the output force to the output rod 42, S1 the contact area between the ring plate 40 and the rubber disc 39, and S2 the contact area between the cylindrical portion 45 of the block 44 and the rubber disc 39.

When the input force is so large that the valve seat 31 of the plunger 22 is kept separated from the seat portion 35 of the valve member 33, the following relationship is obtained:

$$F3 = F1 + F2\text{max},$$

where F2max represents the maximum movement force of the movable body 14.

When the input force F1 is gradually decreased to connect the clutch, or when the clutch pedal is gradually returned to the original position, the input rod 21 is gradually moved rightwards. The spring force of the conical coil spring portion 28 of the valve spring 30 assists. The valve seat 31 of the plunger 22 is maintained in contact with the seat portion 35 of the valve member 33. The seal portion 35 of the valve member 33 is separated from the valve seat 32 of the inside wall. Air flows from the control chamber 16 into the vacuum chamber 15, and it is sucked from the latter. The pressure difference between the vacuum chamber 15 and the control chamber 16 is gradually decreased. The movable body 14 is moved rightwards by the spring force of the preloaded spring 67. The head portion 18f of the movable body 14 comes to contact with the front shell 3. Air in the control chamber 16 is sucked up through the vacuum chamber 15 by the air sucking source. The pressure difference between the chambers 15 and 16 becomes zero. During the above described operation, the clutch apparatus is put into the connecting condition through the semi-clutch condition from the disconnecting condition.

The advantages and merits of the above decribed pull-type booster 1 are as follows:

(1) The input rod 21 and the plunger 22, the plunger 22 and the casing 27, and the ring plate 38 and the output rod 42 contact with each other through the spherical surfaces respectively. Accordingly, even when these parts are somewhat inclined from the axial direction, they can be smoothly operated without distorting and damaging the associated parts. Particularly, even when the input rod 21 or the casing 27 is inclined from the axial direction, the operation of the plunger 22 is smooth. The seat portion 35 of the valve member 33 is not erroneously separated from the valve seats 31 and 32, or contacted with them.

(2) The head portion 21a of the input rod 21 contacts through the support ring 79 with the stopper 78. Thus, the contact surface of the head portion 21a can be increased. Accordingly, it is avoided that the head portion 21a is locally worn. When the support ring 79 is made of hard material, it is not preferentially worn. The play of the input rod 21 can be minimized.

(3) The seal portion 59 of the boot 53 at its one end portion is fixed between the cylindrical portion 17 of the front shell 3 and the cylindrical portion 18 of the movable body 14, and the ring portion 54 of the boot 53 at its another end portion is fixed to the support member 50 which is fixed to the block 44. The bending portion around the ring portion 54 can pinch the air filter together with the cylindrical portion 18 of the movable body 14 and the block 44. Thus, the fixing manner of the boot 53 to the movable body 14 is simple.

(4) When the clevis 20 fixed to the input rod 21 is connected directly to the clutch pedal, the clevis 20 moves on a part of a circle with tread of the clutch pedal, since the connecting point of the clutch pedal and clevis 20 is somewhat distant from the center of rotation of the clutch pedal. In that case, the input rod 21 somewhat swings with respect to the axial direction of the main body 4 of the booster 1. The slide ring 70 slides on the bottom of the recess 68 of the rear shell 2. Since the more flexible portion 74 is formed in the seal member 71, the seal member 71 can easily deform with the slide movement of the slide ring 70 in the manner that air gap is not made between the lip portion 72 of the seal member 71 and the input rod 21. If the more flexible portion 74 is not formed in the seal member 71, the upper or lower portion of the seal member might not deform in compliance with swing of the input rod 21. In that case, some air gap might be made between the lid portion 72 of the seal member and the input rod 21, resulting in deterioration of sealing property. In this embodiment, even when the input rod 21 somewhat swings, deterioration of sealing property of the seal member 71 can be avoided.

(5) Some pressure difference between atmosphere and the low pressure in the vacuum chamber 15 acts on the slide ring 70 and the lip portion 72 and 72a of the seal member 71. Accordingly, the lip portions 72 and 72a of the seal member 71 are pressed to the input rod 21 and the bottom of the recess 68. Sufficient sealing property can be obtained even in swing of the input rod 21.

(6) The internal space 68a of the more flexible portion 74 communicates through the small opening 74a with atmosphere. Accordingly, the above described pressure difference does not act on the more flexible portion 74. The inner portion of the seal member can easily displace with swing of the input rod 21.

(7) Since the slide ring 70 is made of synthetic resin, the slide resistance between the slide ring 70 and the bottom of the recess 68 can be small. Accordingly, the slide ring 70 can easily respond to the swing of the input rod 21.

(8) The block 44 can be mounted to the cylindrical portion 18 of the movable body 14 in such a simple manner that the block 44 is pushed to the cylindrical portion 18 and then the former is rotated relative to the latter, and it can be demounted from the cylindrical portion 18 of the movable body 14 in such a simple manner that the block 44 is rotated relative to the cylindrical portion 18, and then the former is pulled out from the latter. The radial projections 62 of the block 44 and the recesses 18e of the heights 18a of the cylindrical portion 18 can be firmly and securely engaged with each other by the waved ring spring 63. The mounting and demounting operation of the block 44 is easy, and can be effected in a short time. The labor efficiency can be improved.

(9) Before the wire 83 is connected to the output rod 42, the screw position of the nut 82 to the thread 42a of the output rod 42 is adjusted to a predetermined position with respect to the main body 4 or the U-shaped support member 85, and the cup-shaped connecting member 84 is fitted to the nut 82. Thus, the wire 83 can be connected to the input rod 42 at a predetermined position with respect to the booster 1. The wire connecting operation is simple. In such a connection-adjusting arrangement, the thread 42a is formed on the circumference of the output rod 42 and the cup shaped connecting member 84 is fitted to the nut 82 engaged with the thread 42a. Accordingly, the dimensions of the connection-adjusting arrangement in the axial and radial directions can be minimized. A second screw member fixed to the end of the wire 83 and a third screw member for adjusting are unnecessary. Thus, the booster can be small-sized.

(10) The U-shaped support member 85 fixing the mounting metal member 86a of the wire guide tube 86 is fixed to the main body 4. Accordingly, a special means for fixing a support member of a wire guide tube to the chassis of the automobile is unnecessary, and so the construction of the chassis can be simplified. Further, since the support member 85 is U-shaped, and it is fixed to the main body 4 at two positions, it can be securely fixed to the main body 4, and the mounting metal member 86a and therefore the wire guide tube 86 can be stably supported in the chassis of the automobile.

While the preferred embodiment has been described, variations thereto will occur to those skilled in the art within the scope of the present inventive concepts which are delineated by the following claims.

For example, in the above embodiment, a wire is connected to the output rod 42, while no wire is connected to the input rod 21. A wire may be connected also to an input rod.

The above described booster 1 is used for the clutch apparatus. However, a pull-type booster according to this invention may be applicable also to a brake apparatus or an accelerator apparatus.

In the above embodiment, the stopper ring 78 and the supported ring 79 are separate parts. However, they may be formed integrally with each other. Or the support ring 79 may consist of two or more parts. In this case, these parts contact with each other in spherical surface.

Further, the small opening 74a may be omitted from the seal member 71. The lip portion 72a may be omitted therefrom. In this case, the sealing is effected by the fixing portion 73 and the lip portion 72. The slide ring 70 may be omitted from the seal assembly 69.

Figure 6:
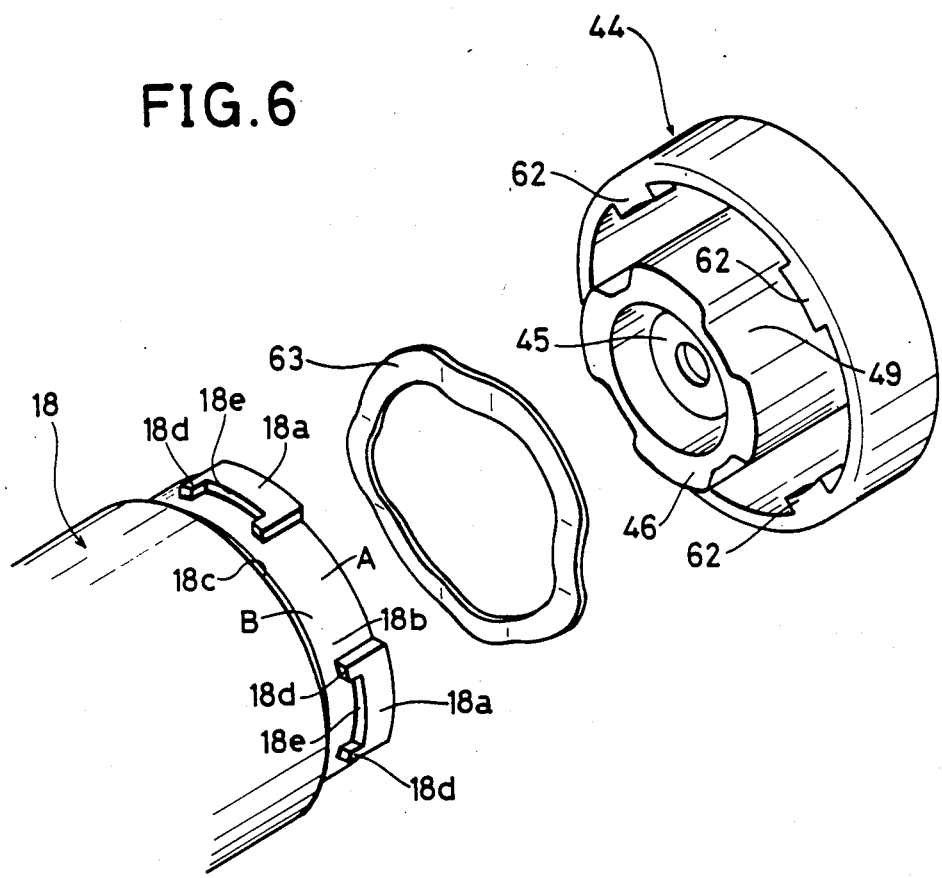
FIG. 6 is an exploded perspective view of the part of the cylindrical portion of the movable body, the block and a waved spring ring interposed between them.

Further, the shapes of the depressions 18b and E of the cylindrical portion 18 of the movable body 14, and of the radial projections 62 of the block 44 are not limited to those shown in FIG. 6 and FIG. 7. Or a depression or depressions may be formed in the block 44. In this case, a projection or projections to be fitted to the depression or depressions are formed in the cylindrical portion 18 of the movable body 14. Or a depression or depressions, or a projection or projections may be formed in the inner circumferential surface of the cylindrical portion 18 of the main body 14, instead of the outer circumferential surface as shown in FIG. 6 and FIG. 7. In this case, a projection or projections, or depression or depressions to be fitted to the depression or depressions, or projection or projections, of the cylindrical portion 18 of the movable body 14 are formed in the outer circumferential surface of the block 44.

Further, in FIG. 7, the taper surface C is formed in the cylindrical portion 18 of the movable body 14. Alternatively, a taper surface may be formed in the projection 62 of the block 44.

Further, a reinforcing member or portion may be added to, or formed in the cylindrical portion 18 or the block 44.

Further, the wire supporting member 85 is U-shaped, and stepped in the above embodiment. However, it does not always need to be stepped. Reinforcing rib or ribs may be formed in the support member 85.

Further, a lock nut may be screwed to the thread 42a of the output rod 42 for the nut 82 in order to prevent the rotation of the nut 82.

The nut 82 is circular. Numerous grooves are formed in the circumference of the nut 82. The shape of the nut 82 and the connecting member 84 to be fitted may be elliptical or polygonal.

When a wire is connected to the input rod 21, the adjusting nut 82 and the cup-shaped connecting member 84 to be fitted to the adjusting nut 82 may be used for the input rod 21 in the same manner as for the output rod 42.

What is claimed is:

1. A pull-type booster for a vehicle comprising:
   (A) a main body having an internal space;
   (B) a movable body including a head portion and a cylindrical portion formed integrally with said head portion, said head portion being arranged in said internal space and partitioning said internal space into a lower pressure chamber at one side and a control chamber at another side;
   (C) a through hole formed in said movable body;
   (D) a pull input means extending across said low pressure chamber and projecting through a seal means from said main body at said one side;
   (E) a plunger means arranged slidably in said through hole and combined with a head portion of said pull input means;
   (F) a valve means arranged in said through hole and operated by said plunger means for generating a pressure difference between said lower pressure chamber and said control chamber and moving said movable body in the direction of said lower pressure chamber;
   (G) a power transmission means, arranged in an opening end portion of said through hole and engaged with said plunger means, said power transmission includes a block fitted to said cylindrical portion of the movable body and further includes a cup-shaped casing slidably fitted into said block, and engaged with a head portion of said plunger means; and
   (H) a pull output means engaged with said power transmission means and projecting outwards from said cylindrical portion of the movable body.

2. A pull-type booster according to claim 1, in which said seal means includes a seal member fixed to said main body at its outer circumferential portion and fitted to said pull input means at its inner circumferential portion, and a more flexible portion is formed between said outer circumferential portion and said inner circumferential portion in said seal member;

3. A pull-type booster according to claim 2, in which said more flexible portion is in the form of an annular projection.

4. A pull-type booster according to claim 3, in which a small opening is made in said more flexible portion.

5. A pull-type booster according to claim 2, in which a lip portion fitted to said input means is formed in said inner circumferential portion of the seal member.

6. A pull-type booster according to claim 5, in which said seal means further includes a slide ring slidably fitted to said pull input means, slidable on the outer surface of said main body and covered by said seal member.

7. A pull-type booster according to claim 6, in which said slide ring is made of synthetic resin.

8. A pull-type booster according to claim 2, in which a reinforcement ring core is embedded in said outer circumferential portion of the seal member.

9. A pull-type booster according to claim 1, in which said head portion of the pull input means is so combined with said plunger means as to be swingable with respect to said plunger means.

10. A pull-type booster according to claim 9, in which said head portion of the pull input means is combined in spherical contact with said plunger means, and it is prevented from coming off from said plunger means by a stopper means engaged with said plunger means.

11. A pull-type booster according to claim 10, in which a support ring is interposed between said head portion of the pull input means and said stopper means.

12. A pull-type booster according to claim 11, in which said support ring spherically contacts with said head portion of the pull input means.

13. A pull-type booster according to claim 12, in which the material of said support ring is harder than that of said head portion of the pull input means.

14. A pull-type booster according to claim 1, in which a radial projection or projections are formed in the outer circumference of said block or in the inner circumference of said cylindrical portion of the movable body, and a depression or depressions fittable to said radial projection or projections are formed in the inner circumference of said cylindrical portion of the movable body or in the outer circumference of said block, said depression or depressions consisting of a first portion or portions extending in the axial direction and a second portion or portions extending in the peripheral direction.

15. A pull-type booster according to claim 1, in which a radial projection or projections are formed in the inner circumference of said block or in the outer circumference of said cylindrical portion of the movable body, and a depression or depressions fittable to said radial projection or projections are formed in the outer circumference of said cylindrical portion of the movable body or in the inner circumference of the said block, said depression or depressions consisting of a first portion or portions extending in the axial direction and a second portion or portions extending in the peripheral direction.

16. A pull-type booster according to claim 15, in which said depression is so shaped as to form peripheral heights in the outer circumference of said cylindrical portion of the movable body or in the inner circumference of said block.

17. A pull-type booster according to claim 16, in which peripheral recesses are formed in said peripheral heights, respectively, facing to said second portion of the depression, and said radial projections of the block or cylindrical portion of the movable body are fittable into said peripheral recesses, respectively.

18. A pull-type booster according to claim 15, in which a spring means is arranged between said cylindrical portion of the movable body and said block.

19. A pull-type booster according to claim 18, in which said spring means is a waved ring spring.

20. A pull-type booster according to claim 15, in which said depressions are L-shaped.

21. A pull-type booster according to claim 20, in which the inner side surfaces of said L-shaped depressions are inwardly tapered.

22. A pull-type booster according to claim 20, in which the side surfaces of said radial projections to be faced to the inner side surfaces of said L-shaped depressions are tapered.

23. A pull-type booster according to claim 1, in which said power transmission means further includes first and second ring plates and a rubber disc interposed between said first and second ring plates, said pull output means slidably passing through said first ring plate, said rubber disc and an inner cylindrical portion of said block, said first and second ring plates and rubber disc are slidably fitted into said cup-shaped casing, said inner cylindrical portion of the block is slidably fitted into said second ring plate, and a head portion of said pull output means in engaged with said first ring plate, said inner cylindrical portion of the block being able to contact with said rubber disc.

24. A pull-type booster according to claim 23, in which said head portion of the pull output means is engaged in hemi-spherical contact with said first ring plate.

25. A pull-type booster according to claim 23, in which said first and second ring plates and rubber disc are prevented from coming off by radial projections formed in the end of said cup-shaped casing.

26. A pull-type booster according to claim 23, in which a reinforcing ring plate is embedded in said rubber disc, and the outer diameter of said reinforcing ring plate is larger than the diameter of the hole of said inner cylindrical portion of the block, the inner diameter of said reinforcing ring plate being nearly equal to the diameter of said pull output means, although said pull output means being slidable on said reinforcing ring plate.

27. A pull-type booster according to claim 1, in which said cut-shaped casing is engaged in hemi-spherical contact with said head portion of the plunger means.

28. A pull-type booster according to claim 1, in which a guitar-shaped opening is formed in the bottom of said cup-shaped casing, and said plunger means are assembled to said cup-shaped casing in the manner that said head portion of the plunger means is inserted through a larger portion of said guitar-shaped opening, and engaged at a smaller portion of said guitar-shaped opening.

29. A pull-type booster according to claim 1, in which said valve means includes a flexible valve member having a seat portion, and a valve spring means arranged between said flexible valve member and said cup-shaped casing.

30. A pull-type booster according to claim 29, in which a first valve seat in the shape of an annular projection is formed in a main portion of said plunger means, a second valve seat in the shape of an annular projection, positioned around said first valve seat, shifted from the latter in the axial direction, is and formed in the inside wall of said movable body, said first and second valve seats facing to said seat portion of the flexible valve member.

31. A pull-type booster according to claim 30, in which said valve spring means urges said seat portion of the flexible valve member towards said first and second valve seats.

32. A pull-type booster according to claim 31, in which said valve spring means consists of a cylindrical coil spring portion and a conical coil spring portion formed integrally with said cylindrical coil spring portion, said cylindrical coil spring portion urging said seat portion of the flexible valve member towards said first and second valve seats, and said conical coil spring portion urging said cup-shaped casing in the opposite direction.

33. A pull-type booster according to claim 32, in which, when said pull input means is not pulled, said first valve seat contacts with said seat portion of the flexible valve member, while said second valve seat is separate from said seat portion of the flexible valve member, where said control chamber communicates with said low pressure chamber, but it is interrupted from atmosphere.

34. A pull-type booster according to claim 1, in which a cylindrical support member is fixed to said block, and a flexible boot covering said cylindrical portion of the movable body is anchored to said cylindrical support member at an end portion.

35. A pull-type booster according to claim 34, in which said cylindrical support member is fixed to said block in the manner that it is elastically fitted into said block.

36. A pull-type booster according to claim 34, in which another end portion of said flexible boot is formed as a seal portion which is pinched between said main body and said cylindrical portion of the movable body.

37. A pull-type booster according to claim 36, in which said seal portion of the flexible boot is pressed to said main body by an elastic ring.

38. A pull-type booster for a vehicle comprising:
(A) a main body having an internal space;
(B) a movable body including a head portion and a cylindrical portion formed integrally with said head portion, said head portion being arranged in said internal space and partitioning said internal space into a lower pressure chamber at one side and a control chamber at another side, and said cylindrical portion projecting from said main body at said other side;
(C) a through hole formed in said movable body;
(D) a pull input means extending across said low pressure chamber and projecting through a seal means from said main body at said one side;
(E) a plunger means arranged slidably in said through hole and combined with a head portion of said pull input means;
(F) a valve means arranged in said through hole and operated by said plunger means for generating a pressure difference between said lower pressure chamber and said control chamber and moving said movable body in the direction of said lower pressure chamber;
(G) a power transmission means arranged in an opening end portion of said through hole and engaged with said plunger means, said power transmission means includes a block fitted to said cylindrical portion of the movalbe body wherein a cylindrical support member is fixed to said block and a flexible boot covering said cylindrical portion of the movable body is anchored to said cylindrical support member at an end portion;
(H) a pull ouput means engaged with said power transmission means and projecting outwards from said cylindrical portion of the movable body.

39. A pull-type booster for a vehicle comprising:
(A) a main body having an internal space;
(B) a movable body including a head portion and a cylindrical portion formed integrally with said head portion, being arranged in said internal space and partitioning said internal space into a lower pressure chamber at one side and a control chamber at another side;
(C) a through hole formed in said movable body;
(D) a pull input means extending across said low pressure chamber and projecting through a seal means from said main body at said one side;
(E) a plunger means arranged slidably in said through hole and combined with a head portion of said pull input means;
(F) a valve means arranged in said through hole and operated by said plunger means for generating a pressure difference between said lower pressure chamber and said control chamber and moving said movable body in the direction of said lower pressure chamber;
(G) a power transmission means arranged in an opening end portion of said through hole and engaged with said plunger means;
(H) a pull output means engaged with said power transmission means and projecting outwards from said cylindrical portion of the movable body; and
(I) a thread formed in the circumference of said pull input means or pull output means, wherein an adjusting screw member is screwed to said thread and a wire connecting member, for fixing a wire, is engaged with said adjusting screw member.

40. A pull-type booster according to claim 39, in which said wire connecting member is cup-shaped, and said adjusting screw member is stopped by hooks made in the wire connecting member.

41. A pull-type booster for a vehicle comprising:
(A) a main body having an internal space;
(B) a movable body including a head portion and a cylindrical portion formed integrally with said head portion, said head portion being arranged in said internal space with a lower pressure chamber at one side and a control chamber at another side, said said cylindrical portion projecting from said main body at said other side;
(C) a through hole formed in said movable body;
(D) a pull input means exending across said low pressure chamber and projecting through a seal means from said main body at said one side;
(E) a plunger means arranged slidably in said through hole and combined with a head portion of said pull input means;
(F) a valve means arranged in said through hole and operated by said plunger means for operating a pressure difference between said lower pressure chamber and said control chamber and moving said movable body in the direction of said lower pressure chamber;
(G) a power transmission means arranged in an opening end portion of said through hole and engaged with said plunger means;
(H) a pull output means engaged with said power transmission means and projecting outwards from said cylindrical portion of the movable body; and
(I) a wire connected to said pull input means or said pull output means, and a generally U-shaped support member, for supporting a wire guide means of said wire, is fixed to said main body.

* * * * *